United States Patent
Takeda et al.

(10) Patent No.: US 6,641,792 B2
(45) Date of Patent: Nov. 4, 2003

(54) HOLLOW CARBON FIBER AND PRODUCTION METHOD

(75) Inventors: Shinji Takeda, Tokyo (JP); Noriyuki Taguchi, Tokyo (JP); Kazumi Kokaji, Hitachi (JP); Osamu Hirai, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 10/270,452

(22) Filed: Oct. 15, 2002

(65) Prior Publication Data

US 2003/0039830 A1 Feb. 27, 2003

Related U.S. Application Data

(62) Division of application No. 09/984,157, filed on Oct. 29, 2001.

(30) Foreign Application Priority Data

| Aug. 3, 2001 | (JP) | 2001-235740 |
| Aug. 3, 2001 | (JP) | 2001-235741 |
| Aug. 3, 2001 | (JP) | 2001-235742 |

(51) Int. Cl.[7] .................................................. D01F 9/12
(52) U.S. Cl. .............................. 423/445 R; 423/447.1; 423/447.4; 423/447.9; 428/304.4; 428/313.3
(58) Field of Search ........................... 428/304.4, 313.3, 428/408; 423/445 R, 447.1, 447.4, 447.9

(56) References Cited

U.S. PATENT DOCUMENTS

| 3,891,574 A | * | 6/1975 | Kobayashi et al. |
| 3,949,115 A | * | 4/1976 | Tamura et al. |
| 5,089,135 A | * | 2/1992 | Yoneyama et al. |
| 5,338,605 A | * | 8/1994 | Noland et al. |
| 5,424,054 A | * | 6/1995 | Bethune et al. |
| 5,925,591 A | * | 7/1999 | Soffer et al. |
| 6,242,093 B1 | * | 6/2001 | Ferguson |
| 6,506,323 B1 | * | 1/2003 | Han |

FOREIGN PATENT DOCUMENTS

| JP | 2845675 | 10/1998 |
| JP | 2000 95509 | 4/2000 |
| JP | 2000109310 | 4/2000 |

* cited by examiner

*Primary Examiner*—H. Thi Le
(74) *Attorney, Agent, or Firm*—Antonelli, Terry, Stout & Kraus, LLP

(57) ABSTRACT

Production of hollow carbon fibers and hollow carbon particles includes baking and carbonization of polymer particles having a specified volume after deformation. A metal-deposited carbon fiber with metal deposited inside and/or outside the hollow carbon fiber is applicable to electron discharge devices. The thickness and crystallinity of the graphite layer can be freely controlled. Since almost no by-product is generated, separation and refining using a solvent is not required. A hollow carbon particle of desired shape can be produced at a high yield rate. The hollow carbon fiber represented by a carbon nano-tube can be controlled in such a way that a low resistance and uniform shape are provided so that there is an increase in the amount of electrons discharged from the hollow carbon fiber. Use of this hollow carbon fiber as an electron discharge source provides an excellent electron discharge device characterized by stable pixels.

28 Claims, 2 Drawing Sheets

POLYMER DISAPPEARING DUE TO THERMAL DECOMPOSITION + CARBON PRECURSOR POLYMER

↓

MICRO-CAPSULE

↓

+ POLYMER DISAPPEARING DUE TO THERMAL DECOMPOSITION

↓

↓ MOLTEN YARN

↓ BAKING

CARBON NANO-TUBE

US 6,641,792 B2

HOLLOW CARBON FIBER AND PRODUCTION METHOD

This application is a Divisional application of application Ser. No. 09/984,157, filed Oct. 29, 2001, the contents of which are incorporated herein by reference in their entirety.

BACKGROUND OF THE INVENTION

The present invention relates to a hollow carbon fiber, a hollow carbon particle, a production method thereof, and composite of the fiber and resin.

The hollow carbon fiber represented by a carbon nano-tube is several nm to several hundred nm in diameter and several nm to several dozen nm in length, and the wall thereof is cylindrical in form and is made of several to several dozen graphite walls (layers).

Such a hollow carbon fiber has attracted attention for such conspicuous characteristics as mechanical strength, hydrogen storage properties and electric field discharge properties, and studies have been made on its practical application.

Japanese Patent NO. 2845675 discloses a method in which carbon is coagulated subsequent to its evaporation by arc discharge in an inactive atmosphere; Japanese Application Patent Laid-Open Publication NO. 109310/2000 discloses a method in which at least one of X-rays, microwaves and ultrasonic waves are applied to carbon material including —C° C— and/or —C=C—; and Japanese Application Patent Laid-Open Publication NO. 95509/2000 discloses a method wherein a carbon nano-tube is made to grow by contact between carbon vapor and a non-magnetic transition metal.

In any of these production methods, however, the yield of the intended carbon nano-tube is low, and the by-product of carbonaceous material similar to carbon black and amorphous carbon cannot be avoided. When a metallic catalyst is used, it is necessary to refine the reaction products, and a metallic catalyst cannot be removed completely by refining, with the result that the aforementioned hydrogen storage properties and electric field discharge properties are reduced. Such disadvantages cannot be avoided in the prior art.

Further, the aforementioned production methods are practically incapable of controlling the number of wall layers, the diameter and the length of the hollow carbon tube represented by a carbon nano-tube. It has been very difficult to attain a uniform shape and uniform characteristics.

A hollow carbon particle represented by fullerene is several nm to several hundred nm in diameter, and the wall comprises several nm to several dozen graphite layers, including a five-membered ring or seven-membered ring.

Hollow carbon particles have attracted attention for such conspicuous characteristics as mechanical strength, hydrogen storage properties and electric field discharge properties, and studies have been made on its practical application. In the conventional method of its production, carbon is coagulated subsequent to its evaporation by arc discharge in an inactive atmosphere, and it is then separated and refined.

However, the yield of fullerene is low, and the by-product of carbonaceous material similar to carbon black and amorphous carbon cannot be avoided. Further, separation and refining using a solvent, such as benzene, are essential, and a remarkable reduction in productivity has been unavoidable.

Further, the aforementioned production methods are practically incapable of controlling the number of wall layers, the diameter and the length of the hollow carbon particles represented by fullerene.

SUMMARY OF THE INVENTION

An object of the present invention is to solve the problems involved in the aforementioned known method of production of a hollow carbon fiber represented by a carbon nano-tube obtained therefrom, and hollow carbon particles.

The present invention provides a method of manufacture of a hollow carbon fiber and a hollow carbon particle, which allows the number of wall layers, the diameter and the length of the hollow carbon particles to be controlled, and ensures a uniform shape and uniform characteristics.

What is more, the present invention provides a hollow carbon fiber and its method of production, characterized by comparatively easy mass production, since it does not use a metallic catalyst; hence, it does not require a step of refining and elimination thereof.

The present invention also provides a hollow carbon fiber and its method of production, characterized by comparatively easy mass production with almost no generation of by-products, separation or refining by a solvent.

The following is a summary of aspects of the present invention:

(1) A method of production of a hollow carbon fiber comprising a step of baking and carbonization of polymer particles having a volume of 100 mm$^3$ or smaller after deforming.

(2) A method of production of a hollow carbon fiber according to the aforementioned aspect (1), characterized by deforming the aforementioned polymer particles by heating.

(3) A method of production of a hollow carbon fiber according to the aforementioned aspect (1) characterized by deforming polymer particles with mechanical force.

(4) A method of production of a hollow carbon fiber according to the aforementioned aspect 1, characterized by deforming polymer particles using irradiation of electromagnetic waves.

(5) A method of production of a hollow carbon fiber according to the aforementioned aspect (1), characterized by deforming polymer particles by any one or a combination of the methods described according to the aforementioned aspects (2) to (4).

(6) A method of production of a hollow carbon fiber according to the aforementioned aspect (1), characterized in the fact that the diameter of a polymer particle is 5 to 5000 times that of a hollow carbon fiber as a final product.

(7) A method of production of a hollow carbon fiber according to aspect (1), characterized in the fact that one or both ends of the fiber are closed.

(8) A method of production of a hollow carbon fiber according to aspect (1), characterized in the fact that the aspect ratio (length/diameter) of the fiber is 1 or more.

(9) A method of production of a hollow carbon fiber according to aspect (1), characterized in that the diameter and length of a fiber are controlled by the volume of polymer particles.

(10) A method of production of a hollow carbon fiber according to aspect (1), characterized by a step of producing polymer particles by a combination of polymers disappearing due to thermal decomposition and carbon precursor polymers.

(11) A method of production of a hollow-carbon fiber according to aspect (10), characterized by a step of producing a micro-capsule from polymers disappearing due to thermal decomposition and carbon precursor polymers, and baking the aforementioned micro-capsule subsequent to melting and spinning.

(12) A method of production of a hollow carbon fiber according to aspect (10), characterized in the fact that the difference between the softening temperature of polymers disappearing due to thermal decomposition and that of carbon precursor polymers does not exceed 100 degrees Celsius.

(13) A method of production of a hollow carbon fiber according to aspects (10) or (11), characterized in the fact that the ratio between inner and outer diameters of the aforementioned hollow carbon fiber is controlled by a ratio of the thickness between the layer of polymers disappearing due to thermal decomposition and that of carbon precursor polymers.

(14) A method of production of a hollow carbon fiber according to aspects (10) or (11), characterized in the fact that the number of layers of the aforementioned hollow carbon fiber is controlled by a ratio of the thickness between the layer of polymers disappearing due to thermal decomposition and that of carbon precursor polymers.

(15) A method of production of a hollow carbon fiber according to aspects (10) or (11), characterized by using polymers wherein the residual carbon percentage of polymers disappearing due to thermal decomposition does not exceed 10 percent by weight and that of carbon precursor polymers does not exceed 15 percent by weight.

(16) A method of production of a hollow carbon fiber according to aspect (11), characterized in the fact that the aforementioned micro-capsules are prepared by an interfacial chemical technique.

(17) A method of production of a hollow carbon fiber according to aspect (11), characterized in the fact that the aforementioned micro-capsules are prepared by seed polymerization.

(18) A method of production of a hollow carbon fiber according to aspect (11), characterized in the fact that the aforementioned carbon precursor polymers are formed of a monomer comprising radically polymerizable groups.

(19) A method of production of a hollow carbon fiber according to aspect (18), characterized in the fact that the aforementioned carbon precursor polymer has units formed of acrylonitrile monomers contained in polymers.

(20) A method of production of a hollow carbon fiber according to aspect (11), characterized in the fact that the aforementioned polymer disappearing due to thermal decomposition is formed of a monomer comprising a radically polymerizable group.

(21) A method of production of a hollow carbon fiber according to aspect (11), characterized in the fact that a polymer disappearing due to thermal decomposition and a carbon precursor polymer are formed of a monomer comprising radically polymerizable groups, and compound wherein carbon remains as a major component in the process of carbonization is used as a polymerization initiator.

(22) A hollow carbon fiber according to aspect (1), characterized in the fact that the polymer particles each have a prescribed volume.

(23) A hollow carbon fiber according to any one of aspects (1) to (12) and (16) to (22), comprising a hollow member formed of a polymer disappearing due to thermal decomposition and a carbon shell formed of a carbon precursor polymer.

(24) A composite of a hollow carbon fiber according to aspect (23) and a resin.

(25) A hollow carbon fiber characterized in the fact that the content of metal and a metallic compound does not exceed 1 percent by weight.

(26) A method of production of a hollow carbon fiber characterized in the fact that the content of metal and a metallic compound does not exceed 1 percent by weight, where no metal or metallic compound is used in the steps of production.

(27) A method of production of a hollow carbon fiber characterized in the fact that the content of metal and a metallic compound does not exceed 1 percent by weight, where no metal or metallic compound is eliminated or refined in a step of the production.

(28) A hollow carbon fiber according to aspect (25) comprising a hollow member formed of a polymer disappearing due to thermal decomposition and carbon shells formed of a carbon precursor polymer.

(29) A method of production of a hollow carbon fiber according to aspects (26) or (27), characterized in the fact that the aforementioned hollow carbon fiber is produced by a combination of polymers disappearing due to thermal decomposition and carbon precursor polymers.

(30) A method of production of a hollow carbon fiber according to aspect (29), characterized by a step of producing a micro-capsule comprising polymers disappearing due to thermal decomposition and carbon precursor polymers, and baking the aforementioned micro-capsule subsequent to melting and spinning.

(31) A method of production of a hollow carbon fiber according to aspect (30), characterized by using polymers wherein the residual carbon percentage of polymers disappearing due to thermal decomposition does not exceed 10 percent by weight and that of carbon precursor polymers does not exceed 15 percent by weight.

(32) A method of production of a hollow carbon fiber production method according to aspect (30), characterized in the fact that the aforementioned micro-capsules are prepared by an interfacial chemical technique.

(33) A method of production of a hollow carbon fiber according to aspect (30), characterized in the fact that the aforementioned micro-capsules are prepared by seed polymerization.

(34) A method of production of a hollow carbon fiber production method according to aspect (29), characterized in the fact that the aforementioned carbon precursor polymers are formed of monomers comprising a radically polymerizable group.

(35) A method of production of a hollow carbon fiber according to aspect (34), characterized in the fact that the aforementioned carbon precursor polymer has 35 mole percent or more of units formed of acrylonitrile monomers contained in the polymer.

(36) A method of production of a hollow carbon fiber according to aspect (29), characterized in the fact that the aforementioned polymer disappearing due to thermal decomposition is formed of a monomer comprising a radically polymerizable group.

(37) A method of production of a hollow carbon fiber according to aspect (29), characterized in the fact that a polymer disappearing due to thermal decomposition and a carbon precursor polymer are formed of monomer comprising a radically polymerizable group, and compound wherein carbon remains as a major component in the process of carbonization is used as a polymerization initiator.

(38) A method of production of a hollow carbon fiber according to aspect (29), characterized in the fact that a polymer disappearing due to thermal decomposition and a carbon precursor polymer are formed of a monomer comprising a radically polymerizable group, and a compound comprising only an element selected from among carbon, hydrogen, oxygen, nitrogen, phosphorus, sulfur, fluorine, chlorine, bromine and iodine is used as a polymerization initiator.

(39) A composite of the hollow carbon fiber according to aspect (25) and a resin.

(40) A hollow carbon particle comprising a hollow member formed of a polymer disappearing due to thermal decomposition and a carbon shell formed of a carbon precursor polymer.

(41) A method of production of a hollow carbon particle, characterized in that the aforementioned hollow carbon fiber is produced by a combination of polymers disappearing due to thermal decomposition and carbon precursor polymers.

(42) A method of production of a hollow carbon particle according to aspect (41), characterized by a step of producing a micro-capsule comprising polymers disappearing due to thermal decomposition and carbon precursor polymers, and baking the aforementioned micro-capsule.

(43) A method of production of a hollow carbon particle according to aspects (41) or (42) characterized by using polymers wherein the residual carbon percentage of polymers disappearing due to thermal decomposition does not exceed 10 percent by weight and that of carbon precursor polymers does not exceed 15 percent by weight.

(44) A method of production of a hollow carbon particle according to aspect (42), characterized in the fact that the aforementioned micro-capsules are prepared by an interfacial chemical technique.

(45) A method of production of a hollow carbon particle according to aspect (42), characterized in the fact that the aforementioned micro-capsules are prepared by seed polymerization.

(46) A method of production of a hollow carbon particle according to aspect (42), characterized in the fact that the aforementioned carbon precursor polymers are formed of monomers comprising a radically polymerizable group.

(47) A method of production of a hollow carbon particle according to aspect (46), characterized in the fact that the aforementioned carbon precursor polymer has 35 mole percent or more of units formed of acrylonitrile monomers contained in polymers.

(48) A method of production of a hollow carbon particle according to aspect (42), characterized in the fact that the aforementioned polymer disappearing due to thermal decomposition is formed of a monomer comprising a radically polymerizable group.

(49) A method of production of a hollow carbon particle according to aspect (42), characterized in the fact that a polymer disappearing due to thermal decomposition and a carbon precursor polymer are formed of monomer comprising a radically polymerizable group, and compound comprising only an element selected from among carbon, hydrogen, oxygen, nitrogen, phosphorus, sulfur, fluorine, chlorine, bromine and iodine is used as a polymerization initiator.

DESCRIPTION OF THE PREFERRED EMBODIMENTS

Figure 1:
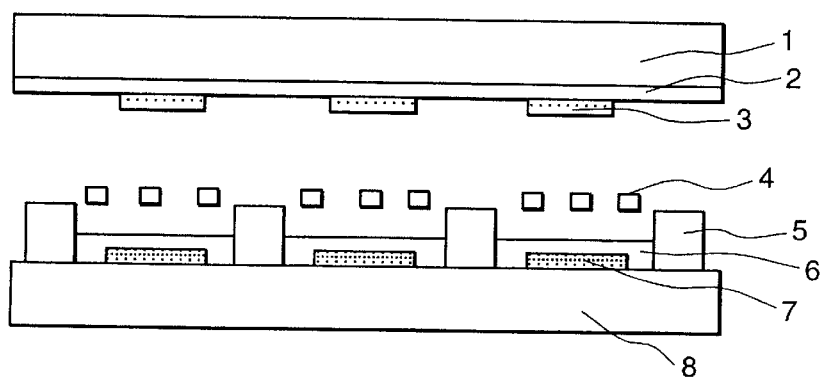
FIG. 1 is a cross sectional view representing an example of an electron discharge device wherein a hollow carbon fiber is used as an electron discharge source.
Figure 2:
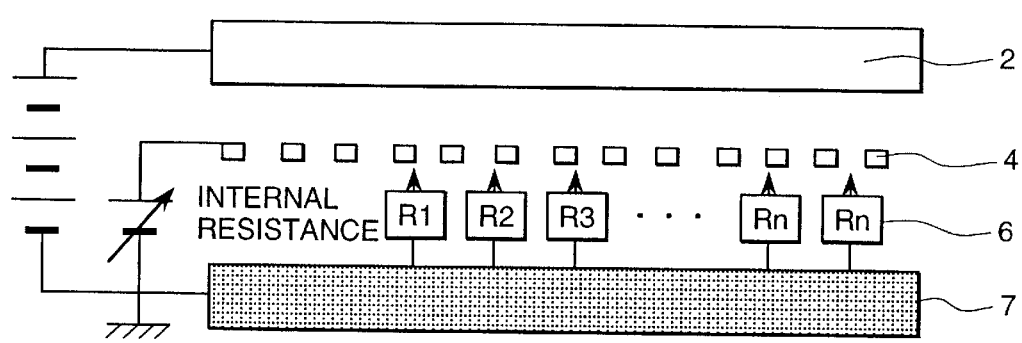
FIG. 2 is a cross-sectional view representing an example of an equivalent circuit of an electron discharge element where the hollow carbon fiber, based on a printing method, is used as an electron discharge source.
Figure 3:
FIG. 3 is a process flow diagram illustrating the hollow carbon fiber production process of the present invention.
Figure 3:
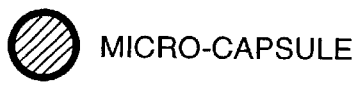
Figure 3:
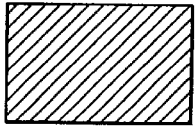
Figure 3:
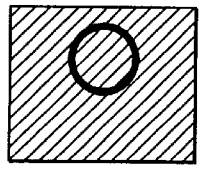
Figure 3:
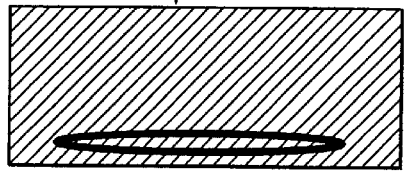
Figure 3:

The following description is directed to a hollow carbon fiber and its production method, which contains a step of baking and carbonization of polymer particles having a specified volume after deforming.

When polymer particles are deformed by heating, they are preferably heated at a temperature higher than that where they are softened. Further, the heating temperature is preferably higher than the glass transition temperature.

Although the diameter of the polymer particle is not restricted, the diameter of the carbon fiber as a final product can be controlled in terms of the diameter of the polymer particle. Accordingly, use of polymer particles having a smaller diameter is preferred to obtain fibers of a small diameter.

It is preferred that the volume of the polymer particle not exceed $100mm^3$. The diameter and length of the carbon fiber as a final product can be controlled in terms of the volume of the polymer particle. Thus, use of polymer particles having a smaller volume is preferred to obtain fibers of a small diameter.

It is preferable for the aspect ratio (length/diameter) of the fiber to be 1 or more. Fibers of the optimum aspect ratio can be provided in response to the particular application. To obtain fine and long fibers, it is effective to increase the heating temperature, decrease the polymer viscosity, increase the spinning speed, and increase the winding speed of the spun yard in the step of melting and spinning.

The difference in the softening temperature between polymers disappearing due to thermal decomposition forming the polymer particle and carbon precursor polymers preferably is not to exceed 100 degrees Celsius. If the temperature difference exceeds 100 degrees Celsius, a difference in viscosity will occur between the polymer disappearing due to thermal decomposition and the carbon precursor polymer in the process of spinning, and the spun yarn will tend to break. The difference in softening temperatures between the two types of aforementioned polymers preferably is not to exceed 50 degrees Celsius. It is more preferable if this difference does not exceed 25 degrees Celsius.

The hollow carbon fiber of the present invention comprises a hollow member formed of a polymer disappearing due to thermal decomposition at the time of baking and a carbon shell formed of a carbon precursor polymer. This can be produced by a combination of polymers disappearing due to thermal decomposition carbon precursor polymers.

As a specific means, it is preferred to have a step of producing a micro-capture from a polymer disappearing due to thermal decomposition and a carbon precursor polymer, and baking the micro-capsule after melting and spinning.

Reaction control in each process will be facilitated by producing a micro-capsule comprising a polymer disappearing due to thermal decomposition and a carbon precursor polymer, and baking it after spinning. The present invention makes it easier to control the shape of the hollow carbon fiber than the aforementioned known production method, and ensures a higher yield.

In the preparation of a micro-capsule according to the present invention, the residual carbon percentage of the polymer disappearing due to thermal decomposition is preferably equal to or smaller than 15 percent by weight, more preferably equal to or smaller than 7 percent by weight, and still more preferably equal to or smaller than 5 percent by weight. The residual carbon percentage of the carbon precursor polymer is preferably equal to or greater than 15 percent by weight, more preferably equal to or greater than 30 percent by weight, and still more preferably equal to or greater than 50 percent by weight.

Control of the diameter of the hollow carbon fiber pore and control of the structure of the graphite forming the wall are facilitated by the use of the polymer disappearing due to thermal decomposition, with the residual carbon percentage being equal to or smaller than 10 percent by weight.

Control of the diameter of the hollow carbon fiber pore and control of the structure of the graphite forming the wall will be made difficult by the use of a carbon precursor polymer having a residual carbon percentage greater than 15 percent by weight, with the result that control to obtain a desired shape is made difficult.

If the aforementioned conditions are met, there is no restriction on the material used for the micro-capsule in the present invention. When the workability in the spinning step is taken into account, use of a thermoplastic resin is preferred.

For example, olefinic resins, such as polyethylene and polypropylene, diene-based resins, such as polybutadiene, acrylic resins, such as methyl polyacrylate and ethyl polyacrylate, methacrylic resins, such as methyl polyamethacrylate and ethyl polymethaacrylate, and polyether resins, such as vinyl polyacetate resin, polyvinyl alcohol resin, polyethylene glycol, and polypropylene glycol can be enumerated as preferred materials for the polymer disappearing due to thermal decomposition Of these acrylic resins, such as methyl polyacrylate and ethyl polyacrylate and methacrylic resins, such as methyl polymethacrylate and ethyl polymethacrylate, are preferred.

Polyacrylonitrile resin, phenol resin, furan resin, divinyl benzene resin, unsaturated polyester resin, polyimide resin, diallyl phthalate resin, vinyl ester resin, polyurethane resin, melamine resin and urea resin can be enumerated as preferred materials for the carbon precursor polymer.

No restriction is placed on the production method for the aforementioned micro-capsule. When the workability in the spinning step is taken into account, use of the following method is preferred: seed polymerization based on the seed of a polymer disappearing due to thermal decomposition having a diameter of 0.001 to 100 micron ($\mu$m), a coacervation method, an interfacial condensation method, a spray drying method and a wet blending method based on use of a hybridizer. The seed polymerization method is preferred when the polymer disappearing due to thermal decomposition has a diameter of 0.001 to 1 micron.

When the micro-capsule is synthesized according to the seed polymerization method, it is preferred to synthesize the micro-capsule from the radically polymerizable monomer. Polyacrylonitrile resin using acrylonitrile resin as a monomer is preferred. Polyacrylonitrile resin containing 35 mole % or more monomer unit formed by acrylonitrile resin in the polymer is preferred.

No restriction is placed on the production method for the polymer disappearing due to thermal decomposition having a diameter of 0.001 to 100 micron. The following methods can be cited as examples: a method of screening for pulverization of a polymer disappearing due to thermal decomposition, or a method of directly obtaining particles by polymerization, such as reversed phase emulsion polymerization, emulsion polymerization, soap free emulsion polymerization, non-aqueous dispersion polymerization, seed polymerization and suspension polymerization. A method of directly obtaining particles by polymerization, such as reversed phase emulsion polymerization, emulsion polymerization, soap free emulsion polymerization, non-aqueous dispersion polymerization, seed polymerization and suspension polymerization, is preferred when the workability is taken into account. Emulsion polymerization and soap free emulsion polymerization are preferred to obtain the polymer disappearing due to thermal decomposition having a diameter of 0.001 to 1 micron.

No restriction is placed on the polymerization initiator used when producing micro-capsules. When a finally produced hollow carbon fiber of higher purity is required, it is preferred to use a compound in which carbon remains as a main component in the step of carbonization, for example, the compound comprising only an element selected from among carbon, hydrogen, oxygen, nitrogen, phosphorus, sulfur, fluorine, chlorine, bromine and iodine, wherein the content of the elements other than carbon does not exceed 30%. Such a compound is exemplified a by diazo compound, such as azobisisobutylonitrile, azobis (2-aminopropane) dihydrochloride, azobis-4-cyianopentanoic acid and azobisdimethylvaleronitrile, organic peroxide, such as benzoyl peroxide, and peroxide salt, such as ammonium persulfate.

The micro-capsule obtained from the aforementioned step is fed to the spinning step. There is no restriction on the spinning means according to the present invention; accordingly, a known method can be used.

For example, when the micro-capsule is molten, it is put into a copper-made crucible as a material together with the resin becoming a matrix (for example, a polymer disappearing due to thermal decomposition which is the same one as that used as the aforementioned micro-capsule seed or a different one), and is heated to 100 to 300 degrees Celsius by a ribbon heater until the material is molten. Then, the molten resin material is wound by a motor through a pore (e.g. 1 mm in diameter).

In this case, there is no restriction to the blending ratio between the micro-capsule and a matrix. For example, the ratio of the former to the latter is preferably 1 to 0.3 through 1.5. The form of the hollow carbon fiber can be controlled by adjusting the heating temperature at the time of melting the material, the pore diameter on the bottom of the crucible, the speed of the winding motor, and the peripheral speed and shape of the winding portion.

Then, a hollow carbon fiber can be obtained in the step of baking and carbonization. The baking and carbonization temperature is preferably from 500 to 3200 degrees Celsius, and, more preferably, from 600 to 3000 degrees Celsius. If the baking and carbonization temperature is below 500 degrees Celsius, formation of a graphite layer will be insufficient, with the result that such characteristics as the mechanical strength, the hydrogen storage characteristics and the electric field discharge characteristics will be reduced. If the baking and carbonization temperature is higher than 3200 500 degrees Celsius, part or almost all of the carbon atoms forming a graphite layer will subliminate, with the result that a defect will be caused on the graphite layer.

The hollow carbon fiber obtained in the aforementioned step is characterized in that the content of metal and a metallic compound is 1 percent by weight or less.

The production method according to the present invention allows hollow carbon fibers to be produced without using a metal or a metallic compound in the hollow carbon fiber production process, or without removing or refining metal or a metallic compound wherein the content of metal and metallic compound is 1percent by weight or less.

The conventional method for producing a carbon fiber requires a catalyst of metal and a metallic compound for the purpose of growth of a gas phase especially in the step of producing carbon tubes. The present invention, however, provides carbon fibers of high purity, especially carbon nano-tubes of high purity, without requiring any catalyst of metal or a metallic compound in a step of the production; hence, no step of removing and refining the catalyst of metal and a metallic compound after production is required.

The following description is directed to a specific production method according to the present invention. However, the present invention is not restricted thereto. For example, it is also possible to form a hollow member using a polymer disappearing due to thermal decomposition in the step of baking, and to form a shell using a carbon precursor polymer, which is turned into carbon by baking. Namely, production is based on a combination between the polymer disappearing due to the thermal decomposition and a carbon precursor polymer.

To put it more specifically, the preferred method for producing hollow carbon fibers is to form micro-capsules from the polymer disappearing due to thermal decomposition and a carbon precursor polymer and to bake them subsequent to melting and spinning.

Reaction control in each process will be facilitated by producing a micro-capsule comprising a polymer disappearing due to thermal decomposition and a carbon precursor polymer, and baking it after spinning. The present invention makes it easier to control the shape of the hollow carbon fiber than the aforementioned known production method, and ensures a higher yield.

The following description is directed to embodiments according to the present invention:

First Embodiment (1) Synthesis of a Polymer Disappearing Due to Thermal Decomposition 35 ml of methyl methacrylate, 350 ml of ion exchange water and 29 mg ammonium persulfate were put in a 1000 ml flask, and an ultrasonic wave was applied for 30 minutes while nitrogen was bubbling therein. An agitating blade was mounted on the flask, and a reaction was performed by agitating it at a speed of 300 rpm at 70 degrees Celsius for 5 hours, then at 80 degrees Celsius for 30 minutes. An emulsified polymer solution disappearing due to thermal decomposition was obtained by this step.

(2) Preparation of Micro-capsules 90 ml of emulsified polymer solution disappearing due to thermal decomposition obtained in step (1), 4 ml of acrylonitrile (carbon precursor polymer), 270 ml of ion exchange water and 5 mg ammonium persulfate were sampled and placed in a 1000 ml flask. Nitrogen gas was bubbled in the aforementioned flask for 30 minutes. Then, an agitating blade was mounted on the flask, and a reaction was performed by agitating it at a speed of 300 rpm at 70 degrees Celsius for 5 hours, then at 80 degrees Celsius for 30 minutes. An emulsified micro-capsule solution was obtained by this step. Water was removed from this emulsified micro-capsule solution by freezing and drying to get micro-capsules.

(3) Spinning, Baking and Carbonization of Micro-capsules

After the micro-capsule obtained in step (2) and the pulverized powder of resin disappearing due to thermal decomposition obtained in step (1) were blended in a mortar at a ratio of 1 to 1 (in weight percentage), they were kneaded while being heated at 120 degrees Celsius in a nitrogen atmosphere, thereby obtaining a resin lump.

Then, this resin lump was put into a copper-made crucible having a diameter of 30 mm and a length of 100 mm with a 1 mm-diameter pore on the bottom. In the nitrogen atmosphere, this copper-made crucible was heated to 170 degrees Celsius by a ribbon heater. Through the pore on the bottom of the copper-made crucible, molten resin was wound on a motor driven at a peripheral speed of 50 m/min., thereby allowing the aforementioned resin lump to be spun.

The fiber gained in the aforementioned spinning step was subjected to melt-proofing in an air flow rate of 30 ml/min. Then, it was heated and baked up to 1000 degrees Celsius at a temperature rising speed of 10 degrees Celsius/hour in an atmosphere of flowing nitrogen in a baking kiln. Then, it was heated by a Tammann electric furnace up to 3000 degrees Celsius at a temperature rising speed of 30 degrees Celsius/hour, and was subjected to graphitization.

The carbon fiber obtained in the aforementioned step was a hollow carbon fiber consisting of three to scores of graphite layers constituting a 3-to 12-nm diameter wall having a pore diameter of 1 to 3 nm.

The amount of metal and metallic compound in the obtained hollow fiber was measured according to procedures specified in the Japanese Industrial Standards graphite ash measuring procedure to obtain the value of 0.01 wt %.

(4) Composite Preparation Method

The hollow carbon fiber obtained in the aforementioned step was used as a filler and was combined with epoxy resin to form a composite. This composite was characterized by excellent properties, such as light weight, superb strength and high resistance to heat. It was very useful for various types of structural members.

Second Embodiment (1) Synthesis of Resin Disappearing Due to Thermal Decomposition 35 ml of methyl methacrylate, 350 ml of ion exchange water and 29 gm of ammonium persulfate were put in a 1000 ml flask, and an ultrasonic wave was applied for 30 minutes while nitrogen was bubbling therein. An agitating blade was mounted on the flask, and a reaction was performed by agitating it at a speed of 300 rpm at 70 degrees Celsius for 5 hours, then at 80 degrees Celsius for 30 minutes. An emulsified polymer solution disappearing due to thermal decomposition was obtained by this step.

(2) Preparation of Micro-capsules From a Polymer Disappearing Due to Thermal Decomposition and a Carbon Precursor Polymer 90 ml of emulsified polymer solution disappearing due to thermal decomposition obtained in step (1), 4 ml of acrylonitrile, 270 ml of ion exchange water and 5 mg of ammonium persulfate were placed in a 1000 ml flask. Nitrogen gas was bubbled for 30 minutes. Then, an agitating blade was mounted on the flask, and a reaction was performed by agitating it at a speed of 300 rpm at 70 degrees Celsius for 5 hours, then at 80 degrees Celsius for 30 minutes. An emulsified micro-capsule solution was obtained by this step. Water was removed from this emulsified micro-capsule solution by freezing and drying to obtain micro-capsules.

(3) Carbonization of Micro-capsules

The micro-capsule obtained in step (2) was subjected to melt-proofing in an air flow rate of 30 ml/min. Then, it was heated and baked up to 1000 degrees Celsius at a temperature rising speed of 10 degrees Celsius/hour in the atmosphere of flowing nitrogen. Then, it was heated by a Tammann electric furnace up to 3000 degrees Celsius at a temperature rising speed of 30 degrees Celsius/hour and was subjected to graphitization.

The carbon fiber obtained in the aforementioned step was a hollow carbon fiber consisting of three to scores of graphite layers constituting a 5 to 50-nm diameter wall having a pore diameter of 3 to 30 nm.

Third Embodiment

Adjustment of Polymer Disappearing Due to Thermal Decomposition Including Metallic Complex 35 g of methyl methacrylate, 2 mg of bis(acetylacetone) platinum, 320 g of azobisisobutylonitrile, 350 ml of ion exchange water and 1.0 g of polyvinyl alcohol were made to react in a 1000 ml flask at a temperature of 80 degrees Celsius for 8 hours. Particles were collected by filtering, and were washed in water and dried to obtain polymer particles disappearing due to thermal decomposition having an average particle diameter of about 200 microns including platinum.

Preparation of Micro-capsules 50 g of the polymer particles prepared in the above step and 25 g of phenol resin having a particle diameter of 50 microns were treated by a hybridizer to obtain microcapsules, where polymethyl methacrylate including a platinum complex was used as a core and phenol resin was used as a shell.

Spinning and Carbonization of Micro-capsule

The micro-capsule prepared in the above step and pulverized polymer disappearing due to thermal decomposition including platinum prepared in the above step were slightly mixed at a ratio of 1 to 1 in weight percentage in a mortar. Then, they were kneaded while being heated at 120 degrees Celsius in a nitrogen atmosphere, thereby obtaining a resin lump. Then, this resin lump was put into a copper-made crucible having a diameter of 30 mm and a length of 100 mm with a 1 mm-diameter pore on the bottom. In a nitrogen atmosphere, this copper-made crucible was heated to 170 degrees Celsius by a ribbon heater. Through the pore on the bottom of the copper-made crucible, molten resin was wound on a motor driven at a peripheral speed of 50 meters, thereby allowing the aforementioned resin lump to be spun.

The fiber gained by spinning was cut into 1 mm pieces, and was then subjected to melt-proofing in an air flow rate of 30 ml/min. Then, it was baked up to 1000 degrees Celsius at a temperature rising speed of 10 degrees Celsius/hour in an atmosphere of flowing nitrogen in a baking kiln. Then, it was heated by a Tammann electric furnace up to 3000 degrees Celsius at a temperature rising speed of 30 degrees Celsius/hour and was subjected to graphitization.

The obtained carbon fiber was examined by a transmission electron microscope to find out that it had a diameter of 3 to 12 nm with a pore diameter from 1 to 3 nm. Further, 70% of the examined samples had a diameter from 8 to 12 nm. It was found to be a hollow carbon fiber consisting of three to scores of graphite layers constituting the wall thereof.

1 g of this hollow fiber was put into a magnetic crucible having an inner volume of 5 ml. It was subjected to ash treatment at 600 degrees Celsius in an atmosphere of air for three hours. Ash was molten together with 20 g of sodium peroxide and was dissolved in chloroazotic acid to obtain a solution. The concentration of platinum in this solution was measured and found to be 0.10%.

Electron Discharge Characteristics of an Electron Discharge Device Wherein a Hollow Carbon Fiber is Used as an Electron Discharge Source Paste using the aforementioned hollow carbon fiber was prepared. The paste was made up of 1 part by weight of hollow carbon fibers dispersed over 2 parts by weight of butyl Carbitol acetate and 0.2 part by weight of ethyl cellulose.

This paste was used to create a cathode substrate having a structure serving as a basis for FIG. 1. Namely, a 5 mm square cathode electrode was formed by pattern printing and baking of a silver paste on a borosilicate glass substrate. The aforementioned 6 mm square carbon fiber paste was printed so as to cover this cathode electrode, and it was baked at 550 degrees Celsius in air to obtain a hollow carbon fiber film. Fifty microns above this simple electrode, a stainless steel disk having a diameter of 1 mm was placed as an anode face-to-face with it via a spacer.

This cathode and anode were set into a vacuum device to obtain a vacuum of 1×10 (0.5) Pa by evacuation.

A voltage was applied between the cathode and anode, and the current discharged from the cathode was measured to verify the voltage where an electron discharge current started to occur. It was revealed that the limit of the current measurement was 1×10(0.7) amperes. When a voltage of 65 volts was applied, the measurement limit of 1×10(0.7) amperes was observed.

Fourth Embodiment

Preparation of Emulsified Polymer Solution Disappearing Due to Thermal Decomposition Without Metallic Complex "2 mg of bis(acetylacetone) platinum" in the preparation of emulsified an polymer solution disappearing due to thermal decomposition in the First Embodiment was changed to "0 mg of bis(acetylacetone) platinum". Otherwise, the present embodiment is the same as the First Embodiment. Based on this condition, polymer particles disappearing due to thermal decomposition without metallic complex were prepared.

Preparation of Carbon Precursor Without Metallic Complex 50 g of polymer particles disappearing due to thermal decomposition without metallic complex as prepared in the aforementioned step and 25 g of phenol resin particles having a particle diameter of 5 microns were treated by a hybridizer to obtain micro-capsules without metallic complex, where polymethyl methacrylate was used as a core and phenol resin was used as a shell.

Treatment of the Metallic Complex Deposited on the Outside of Micro-capsules, Spinning and Carbonization Micro-capsules without metallic complex prepared in the aforementioned step and polymer particles disappearing due to thermal decomposition, including platinum prepared in Embodiment 1, were slightly mixed at a ratio of 1 to 1 in weight percentage in a mortar.

Then, they were kneaded while being heated at 120 degrees Celsius in a nitrogen atmosphere, thereby obtaining a resin lump. Then this resin lump was subjected to a treatment of spinning, melt-proofing, baking and graphitization in a manner similar to that of the first Embodiment.

The obtained carbon fiber was examined by a transmission electron microscope, and it was found to have a diameter of 3 to 12 nm with a pore diameter from 1 to 3 nm. Further, 70% of the examined samples had a diameter from 8 to 12 nm. It was a hollow carbon fiber consisting of three to scores of graphite layers constituting the wall thereof.

Similarly to the First Embodiment, this hollow carbon fiber was subjected to ashing treatment, and the platinum concentration was found to be 0.06% according to the ICP measurement.

Electron Discharge Characteristics of an Electron Discharge Device Wherein a Hollow Carbon Fiber is Used as an Electron Discharge Source According to the same measuring method as that of the First Embodiment, the aforementioned hollow carbon fiber was used to measure the current discharged from the cathode when voltage was applied between the cathode and anode. As a result, a measurement limit of 1×10(0.7) amperes was observed when a voltage of 75 volts was applied.

Comparative Example 1

Preparation of Emulsified Polymer Solution Disappearing Due to Thermal Decomposition Without Metallic Complex "2 mg of bis (acetylacetone) platinum" in the preparation of emulsified polymer solution disappearing due to thermal decomposition in the First Embodiment was changed to "0 mg of bis(acetylacetone) platinum". Otherwise, the present embodiment is the same as the First Embodiment. Based on this condition, polymer particles disappearing due to thermal decomposition without metallic complex were prepared.

Preparation of Carbon Precursor Without Metallic Complex

Carbon precursor without metallic complex was prepared under the same condition as that of the First Embodiment, except that 90 g of the aforementioned emulsified polymer solution disappearing due to thermal decomposition without metallic complex as a polymer disappearing due to thermal decomposition was used.

Spinning and Carbonization of Micro-capsules Without Metallic Capsule

Carbon fibers without metallic capsule were produced under the same condition as that of the First Embodiment, except that the aforementioned micro-capsules without metallic capsule were used as metallic capsules, and the pulverized polymer prepared by freezing and drying the aforementioned emulsified polymer solution disappearing due to thermal decomposition without metallic complex to remove water was used as a pulverized polymer disappearing due to thermal decomposition.

The obtained carbon fiber was examined by a transmission electron microscope, and it was found to have a diameter of 3 to 12 nm with a pore diameter from 1 to 3 nm. Further, 70% of the examined samples had a diameter from 8 to 12 nm. It was a hollow carbon fiber consisting of three to scores of graphite layers constituting the wall thereof.

Electron Discharge Characteristics of an Electron Discharge Device Wherein a Hollow Carbon Fiber Without Metallic Complex is Used as an Electron Discharge Source According to the same measuring method as that of the First Embodiment, the aforementioned hollow carbon fiber was used to measure the current discharged from the cathode when a voltage was applied between the cathode and anode. As a result, a measurement limit of 1×10(0.7) amperes was observed when a voltage of 800 volts was applied.

The voltage applied when the measurement limit current is observed is extremely high, and the electric resistance is also high in Comparative Example 1, as compared with the First and Second Embodiments where the hollow carbon fiber including the metallic complex is used. In this respect, the electron discharge characteristics are poorer in Comparative Example 1.

Hollow carbon fibers and hollow carbon particles according to the present invention hardly contain metal or a metallic compound, or do not contain it at all. Hence, they are free from various contaminations due to metal or unstable electric discharge and can be used in a great variety of fields.

The method of producing hollow carbon fibers according to the present invention makes it possible to control hollow carbon fibers represented by carbon tubes with respect to their characteristic shape, fiber diameter, fiber lengths, pore diameter, thickness of the wall-forming graphite layer, crystallinity and the like.

No metallic catalyst is used in the process of producing hollow carbon fibers and hollow carbon particles; hence, no refining is required. The present invention allows hollow carbon fibers and hollow carbon particles of a desired shape to be produced at a high yield rate.

Hollow carbon fibers and hollow carbon particles according to the present invention provide composites characterized by excellent properties, such as light weight, superb strength and high resistance to heat.

The present invention allows the particle diameter, pore diameter and wall to be determined by adjusting hollow carbon particles represented by fullerene.

What is claimed is:

1. A hollow carbon fiber production method comprising a step of baking and carbonizing polymer particles having a volume of 100 mm$^3$ or smaller after deforming.

2. A hollow carbon fiber production method according to claim 1, wherein the polymer particles are deformed by heat.

3. A hollow carbon fiber production method according to claim 1, wherein the polymer particles are deformed by mechanical force.

4. A hollow carbon fiber production method according to claim 1, wherein the polymer particles are deformed by irradiation of electromagnetic wave.

5. A hollow carbon fiber production method according to claim 1, wherein the polymer particles are deformed by a combination of at least two of heat, mechanical force and irradiation with electromagnetic waves.

6. A hollow carbon fiber production method according to claim 1, characterized in that the diameter of the polymer particles is 5 to 5000 times that of a hollow carbon fiber as a final product.

7. A hollow carbon fiber production method according to claim 1, wherein one or both ends of the fiber are closed.

8. A hollow carbon fiber production method according to claim 1, wherein an aspect ratio (length/diameter) of the fiber is 1 or more.

9. A hollow carbon fiber production method according to claim 1, wherein a diameter and length of a fiber are controlled by volume of the polymer particles.

10. A hollow carbon fiber production method according to claim 1, comprising a step of producing the polymer particles by a combination of polymers disappearing due to thermal decomposition and carbon precursor polymers.

11. A hollow carbon fiber production method according to claim 10, comprising a step of producing micro-capsules from the polymers disappearing due to thermal decomposition and the carbon precursor polymers, and baking said micro-capsules subsequent to melting and spinning.

12. A hollow carbon fiber production method according to claim 11, wherein a ratio between inner and outer diameters of said hollow carbon fiber is controlled by a ratio of thickness between a layer of polymers disappearing due to thermal decomposition and that of the carbon precursor polymers.

13. A hollow carbon fiber production method according to claim 11, wherein a number of layers of said hollow carbon fiber is controlled by a ratio of thickness between a layer of polymers disappearing due to thermal decomposition and that of the carbon precursor polymers.

14. A hollow carbon fiber production method according to claim 11, wherein a residual carbon percentage of the polymer disappearing due to thermal decomposition does not exceed 10 percent by weight and that of the carbon precursor polymers does not exceed 15 percent by weight.

15. A hollow carbon fiber production method according to claim 11, wherein said micro-capsules are prepared by an interfacial chemical technique.

16. A hollow carbon fiber production method according to claim 11, wherein said micro-capsules are prepared by seed polymerization.

17. A hollow carbon fiber production method according to claim 11, wherein said carbon precursor polymers are formed of monomer comprising radically polymerizable groups.

18. A hollow carbon fiber production method according to claim 17, wherein said carbon precursor polymers have units formed of acrylonitrile monomers contained in polymers.

19. A hollow carbon fiber production method according to claim 11, wherein said polymers disappearing due to thermal decomposition are formed of a monomer comprising a radically polymerizable group.

20. A hollow carbon fiber production method according to claim 11, wherein the polymers disappearing due to thermal decomposition and the carbon precursor polymers are formed of a monomer comprising radically polymerizable groups, and a compound wherein carbon remains as a major component in the process of carbonization is used as a polymerization initiator.

21. A hollow carbon fiber production method according to claim 10, wherein a difference between softening temperature of the polymers disappearing due to thermal decomposition and that of the carbon precursor polymers does not exceed 100 degrees Celsius.

22. A hollow carbon fiber production method according to claim 10, wherein a ratio between inner and outer diameters of said hollow carbon fiber is controlled by a ratio of thickness between a layer of polymers disappearing due to thermal decomposition and that of the carbon precursor polymers.

23. A hollow carbon fiber production method according to claim 10, wherein a number of layers of said hollow carbon fiber is controlled by a ratio of thickness between a layer of polymers disappearing due to thermal decomposition and that of the carbon precursor polymers.

24. A hollow carbon fiber production method according to claim 10, wherein a residual carbon percentage of the polymer disappearing due to thermal decomposition does not exceed 10 percent by weight and that of the carbon precursor polymers does not exceed 15 percent by weight.

25. A hollow carbon fiber according to claim 1, wherein each of the polymer particles has a prescribed volume.

26. A hollow carbon fiber according to claim 25, comprising a hollow carbon fiber formed of polymer disappearing due to thermal decomposition and a carbon shell formed of carbon precursor polymer.

27. A hollow carbon fiber according to claim 1, comprising a hollow carbon fiber formed of polymer disappearing due to thermal decomposition and a carbon shell formed of carbon precursor polymer.

28. A composite of the hollow carbon fiber according to claim 27 and resin.

* * * * *